Figure 1:
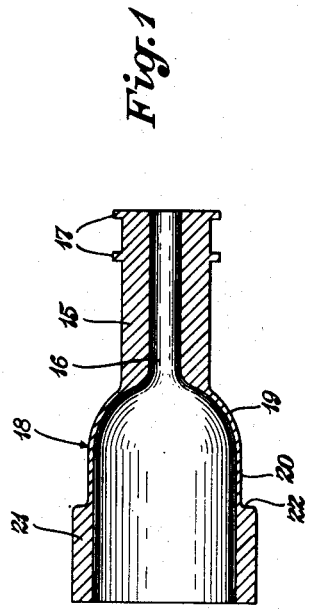

Nov. 10, 1953   C. A. BRAUCHLER ET AL   2,658,265
METHOD OF MAKING PROPELLER BLADES
Filed April 22, 1950   4 Sheets-Sheet 1

INVENTORS
Charles A. Brauchler and
Chandis H. Brauchler

*Frease and Bisley*
ATTORNEYS

Nov. 10, 1953     C. A. BRAUCHLER ET AL     2,658,265
METHOD OF MAKING PROPELLER BLADES
Filed April 22, 1950     4 Sheets-Sheet 2
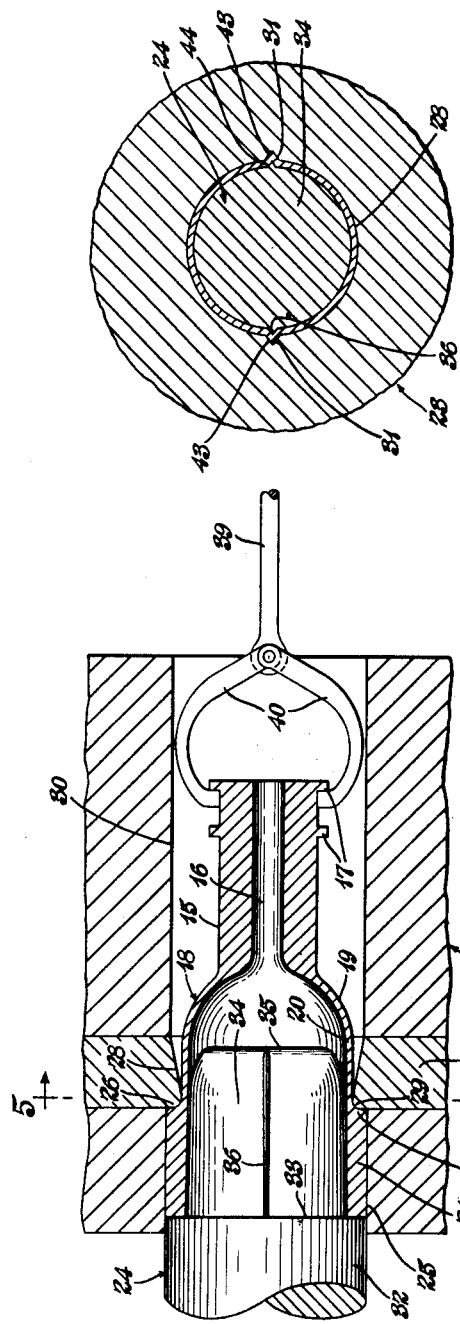
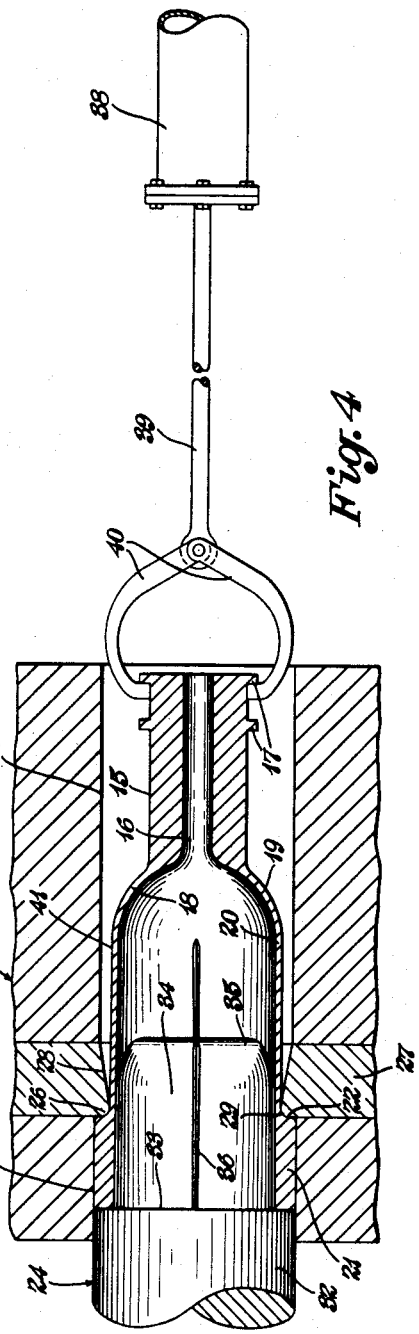
INVENTORS
Charles A. Brauchler
Chandis H. Brauchler
ATTORNEYS Nov. 10, 1953  C. A. BRAUCHLER ET AL  2,658,265
METHOD OF MAKING PROPELLER BLADES
Filed April 22, 1950  4 Sheets-Sheet 3
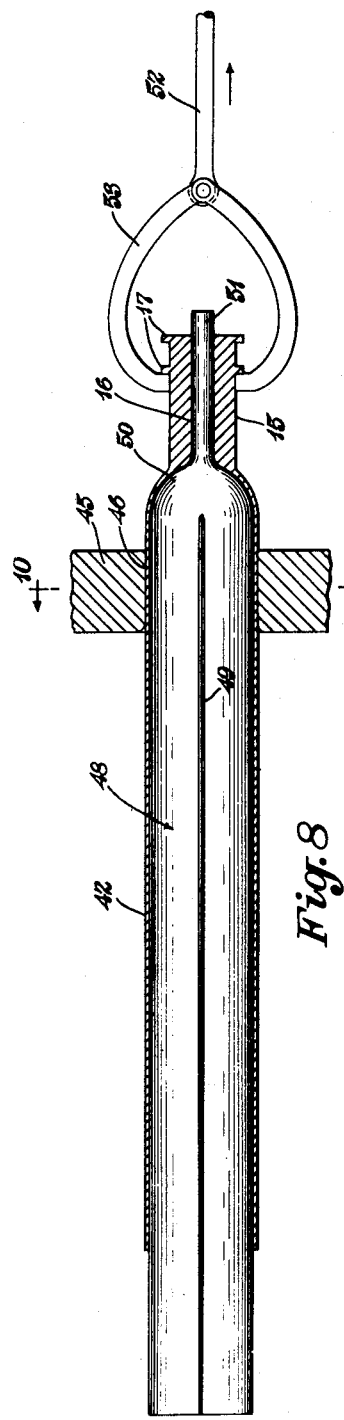
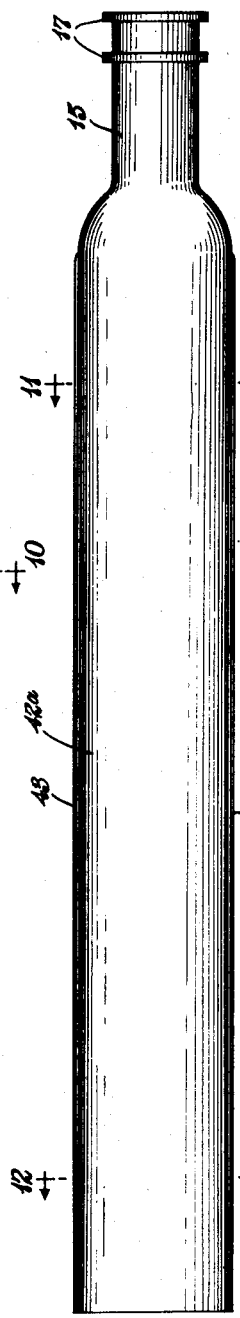
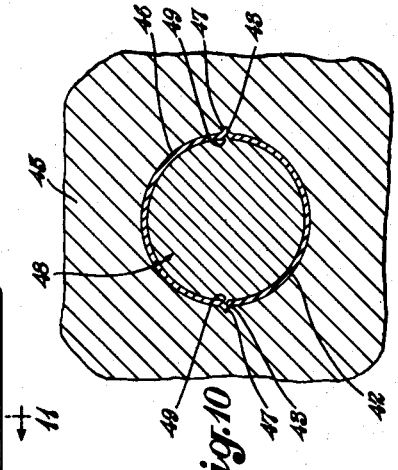
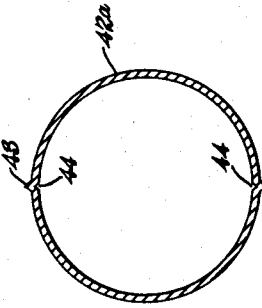
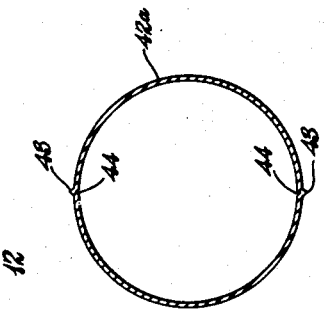
INVENTORS
Charles A. Brauchler
Chandis H. Brauchler
ATTORNEYS Nov. 10, 1953   C. A. BRAUCHLER ET AL   2,658,265
METHOD OF MAKING PROPELLER BLADES
Filed April 22, 1950   4 Sheets-Sheet 4
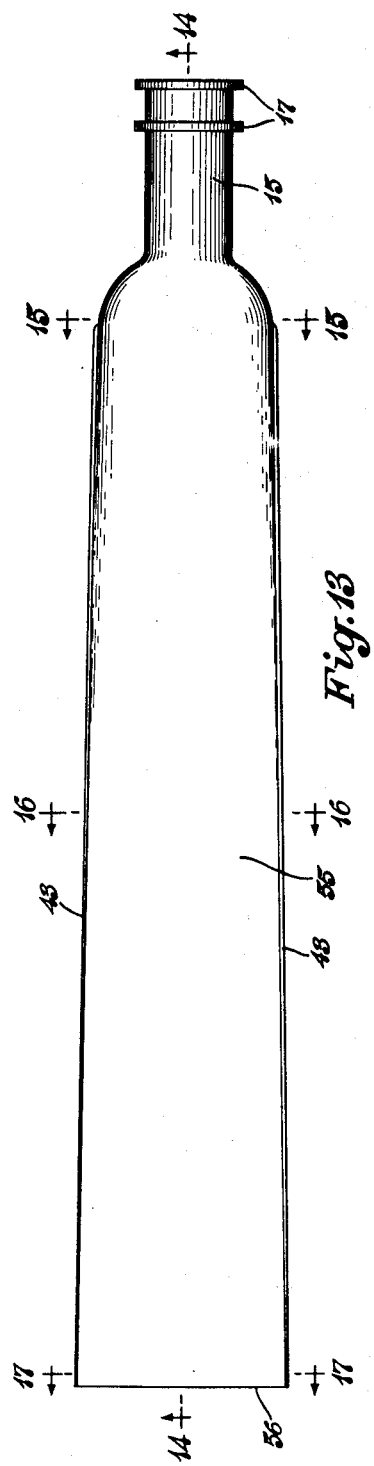
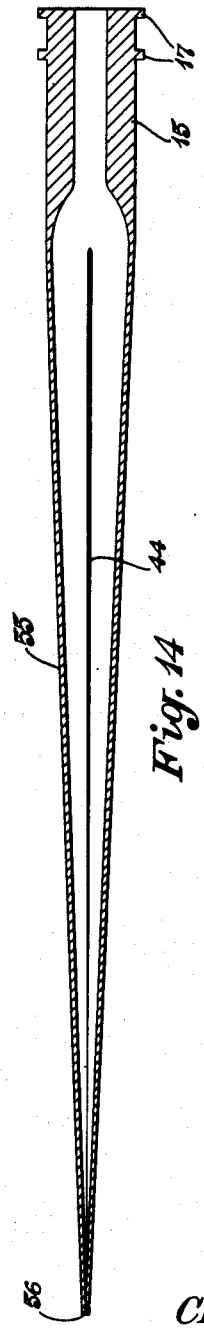
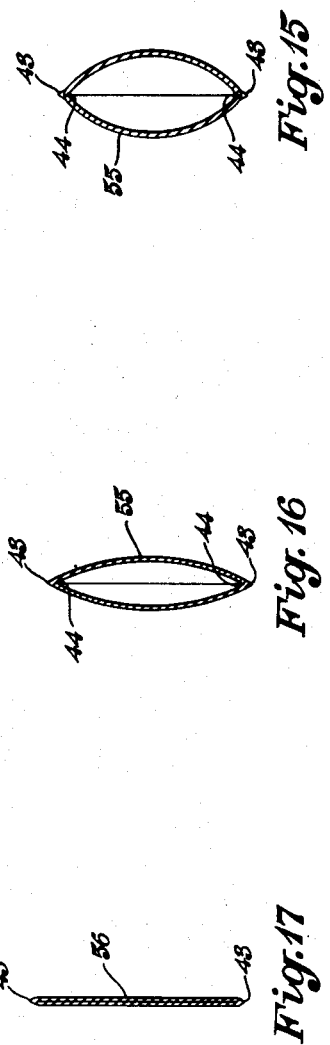
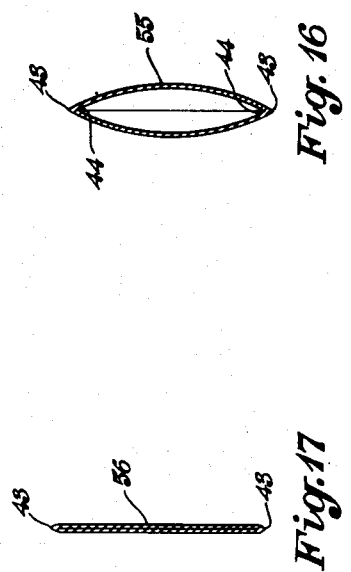
INVENTORS
Charles A. Brauchler
Chandis H. Brauchler
ATTORNEYS Patented Nov. 10, 1953

2,658,265

UNITED STATES PATENT OFFICE 2,658,265

METHOD OF MAKING PROPELLER BLADES

Charles A. Brauchler and Chandis H. Brauchler, Canton, Ohio

Application April 22, 1950, Serial No. 157,576

6 Claims. (Cl. 29—156.8)

The invention relates to the manufacture of propeller blades for aircraft and more particularly to a novel method of making seamless tubular metal blades by extrusion and drawing operations.

It has been proposed to manufacture hollow metal propeller blades from extruded seamless tubes, and while such practice has proven satisfactory, it has been found in actual practice that difficulty has been experienced in extruding the tube to the exact length required for the propeller blade, and where the extruded tube is even only slightly shorter in length than the required length of the finished propeller blade it cannot be advantageously used.

It has also been found in practice that in some cases there is a tendency for the extruded tube to become more or less wavy or uneven in places, during the extrusion operation, and furthermore difficulty has been experienced at times in accurately controlling the wall thickness of the tube during the extrusion operation.

The present invention contemplates the manufacture of hollow propeller blades by extruding and drawing seamless tubes of proper length, the tube being first extruded to a length which may be slightly less than that required in the finished blade and then drawn to the desired length.

It is also an object of the invention to provide a method for manufacturing a hollow propeller blade wherein a blank is extruded into a seamless tube and a pulling power is exerted upon the leading end of the tube during the extrusion operation so as to maintain the tube straight and overcome any tendency of the same to become wavy or uneven.

A further object is to provide for the extrusion of the tube from a forged blank and the subsequent drawing of the tube to finished form.

A still further object is to provide for the drawing of the extruded tube through a drawing die, of proper size and shape, to produce the desired exterior contour of the tube, the tube being located upon a mandrel during the drawing operation to produce the desired inside contour and wall thickness in the tube.

Another object is to subject the extruded tube to a bonderizing, phosphate coating or spheroidizing treatment prior to the drawing operation.

A further object is to provide for the manufacture of hollow propeller blades in the manner above referred to, which includes cold drawing of the extruded tube upon a mandrel and through a drawing die.

A still further object of the invention is to provide for the manufacture of propeller blades in the manner above referred to from a forged blank having a shank portion and an enlarged annulus or ring portion.

Another object is to provide such a method in which the shank portion of the blank is grasped and pulled longitudinally during the extrusion operation.

Still another object is to provide for the forming of integral, longitudinal ribs upon the exterior of the tube, at diametrically opposite points, and correspondingly located longitudinal grooves upon the interior of the tube, during the extrusion and drawing operations.

It is also an object of the invention to provide such a method in which the wall thickness of the tube is uniformly controlled throughout the entire length of the tube.

Figure 6:
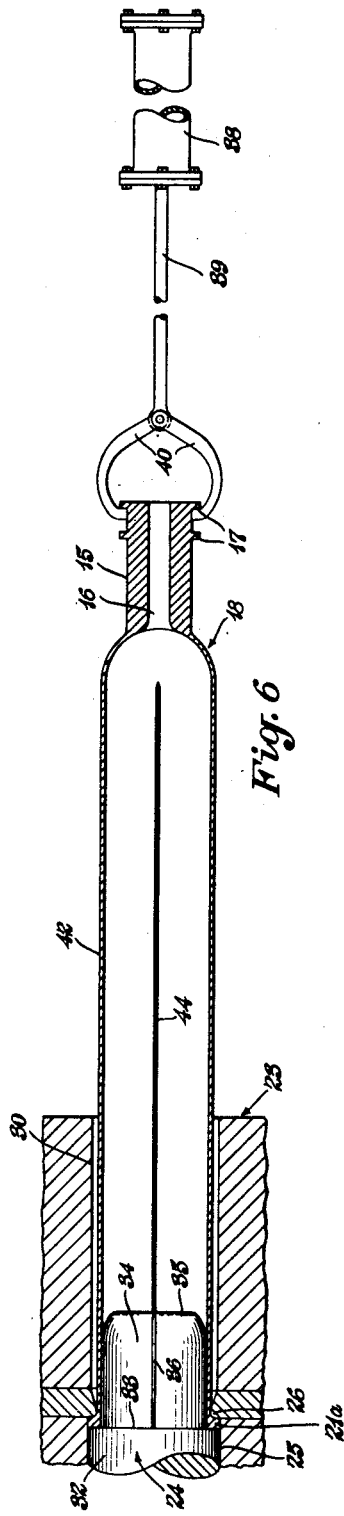
Figure 7:
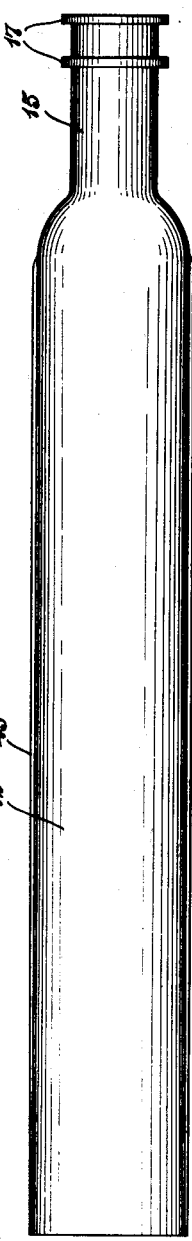
Figure 2:
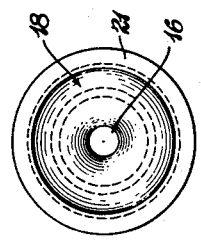

The above objects together with others which will be apparent from the drawings and following description, or which may be later referred to, may be attained by carrying out the method in the manner hereinafter described in detail, with the use of the novel apparatus described and illustrated in the accompanying drawings, in which:

Figure 1 is a longitudinal, sectional view of a forged blank from which the hollow propeller blade may be formed by extrusion and drawing operations;

Fig. 2 an end elevation of the blank shown in Fig. 1;

Fig. 3 a longitudinal, sectional view, upon a slightly larger scale, showing the blank located in the extrusion die and the punch in position for extruding the same, with the pulling means grasping the shank portion of the blank preparatory to operating the same to form the extruded seamless tube;

Fig. 4 a view similar to Fig. 3 showing the parts shortly after the beginning of the extrusion operation;

Fig. 5 a transverse, sectional view through the extrusion dies and the blank, taken as on the line 5—5, Fig. 3;

Fig. 6 a longitudinal, sectional view of the extrusion dies and associated apparatus, showing the extruded, seamless tube substantially at the end of the extrusion operation;

Fig. 7 a side elevation of the extruded tube as produced in the apparatus shown in Figs. 3 to 6;

Fig. 8 a longitudinal, sectional view, showing the extruded tube mounted upon a mandrel in the act of being drawn through the drawing die;

Fig. 9 a side elevation of the completed, extruded and drawn tube;

Fig. 10 a transverse, sectional view through the drawing die, tube and mandrel, taken as on the line 10—10, Fig. 8;

Fig. 11 a transverse, sectional view through the extruded and drawn tube, taken as on the line 11—11, Fig. 9, near the shank end of the tube;

Fig. 12 a similar section, taken as on the line 12—12, Fig. 9, near the tip end of the tube;

Fig. 13 a side elevation of a finished propeller blade made in accordance with the invention;

Fig. 14 a longitudinal, sectional view through the finished propeller blade, taken as on the line 14—14, Fig. 13;

Fig. 15 a transverse, sectional view through the propeller blade, near the shank end thereof, taken as on the line 15—15, Fig. 13;

Fig. 16 a transverse, sectional view through an intermediate portion of the propeller blade, taken as on the line 16—16, Fig. 13; and Fig. 17 a transverse, sectional view through the tip end portion of the propeller blade, taken as on the line 17—17, Fig. 13.

Referring now more particularly to the embodiment of the invention illustrated in the accompanying drawings, in which similar numerals refer to similar parts throughout, in order to carry out the invention, the blank, best shown in Figs. 1 and 2, is first produced, as by forging.

This blank comprises the cylindrical shank portion 15, which is preferably hollow, as indicated by the longitudinal bore 16, and which may be provided with the spaced, annular collars or ribs 17 as required in some types of propeller blades.

Integrally formed upon the other end of the shank 15 is the hollow, thin-walled portion, indicated generally at 18, which is outwardly flared, or curved, as shown at 19, merging into the cylindrical portion 20 and terminating in the ring, or annulus, 21 of increased diameter and greater cross sectional thickness, forming the substantially straight shoulder 22 at the inner end of said annulus.

The apparatus for carrying out the extrusion operation is shown in Figs. 3 to 6 and includes the die block, indicated generally at 23, and the punch indicated generally at 24. Within the entrance end of the die block is located a cylindrical bore 25, of suitable diameter to slidably receive the enlarged ring or annulus portion 21 of the blank, and of a length somewhat greater than the width of said annular, as best shown in Fig. 3.

An inwardly disposed, annular shoulder 26, of a size and shape to abut the shoulder 22 of the annulus, is provided at the inner end of the cylindric bore 25, and, as shown in Figs. 3 and 6, this shoulder 26 is preferably formed upon an insert 27 which may be made of a harder metal than the remainder of the die block.

The bore 28, of the insert portion 27 of the die, is flared inwardly from the rounded nose 29 of the shoulder, as best shown in Figs. 3, 4 and 6, and the inner, larger end of this flared bore registers with the enlarged, cylindrical bore 30, which is located through the remainder of the die block from the insert 27 to the inner end of the die block.

For the purpose of forming diametrically opposite, longitudinal ribs upon the extruded tube, diametrically opposite, longitudinal grooves 31 are located in the interior of the bore 28, and as shown in Fig. 5, these grooves are preferably of substantially V-shape so as to correspondingly shape the ribs, which ultimately form the leading and trailing edges of the propeller blade as will be later explained in detail.

The punch, indicated generally at 24, which cooperates with the above described extrusion dies, includes the cylindrical portion 32 of suitable diameter to provide a sliding fit within the bore 25 at the entrance of the die block. This punch is adapted for reciprocating movement relative to the die block by connection to the ram of a hydraulic cylinder or other conventional and well-known means for producing a reciprocating motion with sufficient power to perform the extrusion operation.

The straight shoulder 33, at the inner end of the enlarged cylindrical portion 29 of the punch, is adapted to engage the outer end of the enlarged ring or annulus 21 of the blank when the same is positioned in the die block as best shown in Fig. 3.

A slightly tapered shank 34 is formed upon the inner end of the punch and is of such diameter as to snugly fit within the annulus 21 of the blank, as best shown in Fig. 3. The inner end of this tapered shank is preferably rounded or reduced, as indicated at 35, so as to facilitate the introduction thereof into the annulus 21.

The tapered shank of the punch is provided on diametrically opposite sides with longitudinal ribs 36, corresponding in position to the grooves 31 in the die block and preferably of V-shape, as best shown in Fig. 5, these ribs cooperating with the grooves 31 in the die block as will be later described in detail.

In carrying out the extrusion operation the blank, as shown in Fig. 1, is heated to forging temperature and placed within the die block 23, the enlarged annulus portion 21 of the blank being received within the bore 25, at the entrance end of the die block, and the shoulder 22 of the blank butting against the shoulder 29 of the die insert 27, in the manner shown in Fig. 3.

As shown in said figure the hollow, rounded or conical portion 18 of the blank, as well as the shank 15 thereof, are received through the flared bore 28 of the die insert and extend into the enlarged cylindrical bore 30 of the die block which provides a considerable clearance around the blank to permit the same to be freely extruded therethrough, as will be later explained.

The punch is then inserted into the die block, the shoulder 33 of the punch contacting the outer end of the enlarged annulus 21 of the blank and the tapered shank 34 of the punch slidably fitting within said annulus, as best shown in Fig. 3.

For the purpose of causing the blank to move in a straight path during the extrusion operation, and to prevent any wavy or irregular condition in the tube thus extruded, pulling means is preferably provided for attachment to the shank end of the blank for pulling the same in a straight line and at a proper speed to correspond to the speed of movement of the same during the extrusion operation.

As shown in Fig. 4, this pulling means may comprise a fluid cylinder 38, which may either be pneumatic or hydraulic, provided with a piston rod 39 having suitable gripping means thereon, such as the jaws 40, for gripping contact with the shank portion 15 of the blank.

With the parts in the position shown in Fig. 3, the punch is operated to move the same into the die block, through the cylindrical bore 25 at the entrance end thereof, compressing the heated annulus portion 21 of the blank between the shoulder 33 of the punch and the shoulder 29 of the die block insert, extruding the metal from the annulus 21 through the die insert and into the bore 30 in a thin, seamless tube, as indicated at 41 in Fig. 4 shortly after the start of the extrusion operation, and at 42 in Fig. 6 at the completion of the extrusion operation.

At the same time that the punch is being forced through the die, to extrude the tube, the cylinder 38 is being operated at a proper speed, commensurate with the movement of the extruded tube through the die, so as to assure the movement of the tube in a straight line and to eliminate or minimize any tendency for the tube to have a wavy or irregular contour.

Owing to the taper of the shank 34 of the punch, the seamless tube thus formed will be of uniformly decreasing wall thickness, from the shank end toward the tip end thereof, although it will be evident that the outer diameter of the tube, which is extruded through the die insert 27, will be uniformly cylindric throughout its length.

Thus the wall thickness of the tube may be controlled by controlling the inner contour of the tube. If it is desired to taper the wall thickness of the tube for only a part of its length and then maintain a uniform wall thickness for the remainder of the length of the tube, the shank of the punch may be correspondingly tapered for only a portion of its length.

As the seamless tube is thus extruded through the die, the ribs 36 on the punch and the grooves 31 in the die block cooperate to form the longitudinal, V-shaped ribs 43 at diametrically opposite points upon the exterior of the tube with corresponding longitudinal grooves 44 on the inside thereof.

After the tube has been extruded as shown in Fig. 6, the punch is withdrawn from the die block and the extruded tube is removed therefrom. Any short remaining portion of the annulus 21 of the blank, as indicated at 21a in Fig. 6, may be cropped from the end of the tube, producing the partly completed product shown in Fig. 7.

This extruded tube may be of a length slightly less than required in the finished propeller blade to be made therefrom and as will now be explained, the extruded tube is then drawn, preferably by a cold drawing operation to the desired length and finished form. This tube may then be subjected to a bonderizing, phosphate coating, or spheroidizing treatment in order to prepare it for a cold drawing operation.

As shown in Fig. 8, a draw bench is provided for the drawing operation and includes a drawing die 45, having a cylindrical bore 46 of suitable diameter for producing the desired outside diameter of the tube, said bore having V-shaped grooves 47 of the diameter necessary for receiving the ribs 43 of the tube 42.

A mandrel, indicated generally at 48, is located within the tube 42 to be drawn, and provided at diametrically opposite sides with longitudinal, V-shaped ribs 49, for location in the V-shaped grooves 44 of the tube, the forward end of the mandrel being rounded, as indicated at 50, and provided with the reduced shank 51 for location through the central bore 16 of the shank portion 15 of the tube, as shown in Fig. 8.

The draw bench is provided with the usual cable, rod or the like, indicated at 52, adapted to be pulled longitudinally in the direction of the arrow shown in Fig. 8, by any usual and well-known power means (not shown) and provided with gripping means, as indicated at 53, for engaging the shank end of the tube and drawing it through the drawing die 45, with the mandrel therein, so as to draw the tube out to the desired length, accurately controlling the wall thickness of the tube throughout its length and removing any wavy contour or irregularities in the tube.

The finished drawn tube, as indicated at 42a in Figs. 9, 11 and 12, is then of proper length and wall thickness for forming a hollow propeller blade therefrom and the surface of the tube is smooth and uniform.

The diametrically opposed ribs 43 and corresponding grooves 44 are retained upon the tube, as shown in Figs. 9 to 12, and the wall thickness of the tube is tapered from the shank end toward the tip end thereof, as indicated in Figs. 11 and 12.

Although the drawing operation above described may be carried out while the tube is cold, it should be understood that if desired the tube may be heated, at least slightly, for the drawing operation.

This partly completed product is then formed into the finished propeller blade shown in Figs. 13 to 17, by either hot or cold forming the tube portion thereof in suitable dies, deforming the tube to substantially elliptical cross section as indicated at 55.

As shown in the above mentioned figures of the drawings, this elliptical cross section is uniformly flattened, from the shank end to the tip end of the blade, at which point the tube is entirely flattened, as indicated at 56 and best shown in Figs. 14 and 17, and may be welded if desired to close the tip end of the blade.

The V-shape ribs 43 form the leading and trailing edges of the finished propeller blade when the same is formed to elliptic cross sectional shape as shown, the corresponding V-shape grooves 44 assisting in thus forming the propeller blade to desired shape. Thus a seamless, tubular blade of desired cross sectional shape is produced with the integral, preformed shank portion 15 thereon.

Although any desired or conventional reinforcing means may be located within the blade thus formed, if desired, such reinforcing means in itself does not form any part of the present invention, which is concerned only with the manufacture of the blade itself in the manner above described, and for this reason no reinforcing means within the finished blade is indicated on the drawings.

We claim:

1. The method of making a seamless, hollow, metal propeller blade, which consists in forming a blank comprising a shank portion, a hollow portion at one end of the shank portion and an annulus of greater cross-sectional thickness surrounding the open end of the hollow portion, heating the blank to forging temperature then extruding the annulus of the blank into a cylindrical seamless tube of slightly less length than required in the finished propeller blade and in the same operation simultaneously extruding diametrically opposite longitudinal ribs upon the exterior of the tube, said tube being a continuation of said hollow portion then in a drawing operation drawing the tube to final finished length while maintaining the longitudinal ribs thereon, and then deforming the seamless extruded, drawn, longitudinally ribbed tube to substantially elliptic cross-sectional shape throughout the greater portion of its length to provide a seamless hollow blade of increasingly flatter elliptic cross-sectional shape from said shank portion toward the tip end, said longitudinal ribs forming the leading and trailing edges of the blade, and securing the flattened tip end of the blade together.

2. The method of making a seamless, hollow, metal propeller blade, which consists in forming a blank comprising a shank portion, a hollow portion at one end of the shank portion and an annulus of greater cross-sectional thickness surrounding the open end of the hollow portion, heating the blank to forging temperature then extruding the annulus of the blank into a cylindrical seamless tube of slightly less length than required in the finished propeller blade and in the same operation simultaneously extruding diametrically opposite longitudinal ribs upon the exterior of the tube, said tube being a continuation of said hollow portion and throughout the extruding operation pulling the shank portion longitudinally in the direction in which the tube is being extruded at a speed corresponding to the speed of the extrusion operation, then in a drawing operation drawing the tube to final finished length while maintaining the longitudinal ribs thereon, and then deforming the seamless, extruded, drawn, longitudinally ribbed tube to substantially elliptic cross-sectional shape throughout the greater portion of its length to provide a seamless hollow blade of increasingly flatter elliptic cross-sectional shape from said shank portion toward the tip end, said longitudinal ribs forming the leading and trailing edges of the blade, and securing the flattened tip end of the blade together.

3. The method of making a seamless, hollow, metal propeller blade, which consists in forming a blank comprising a shank portion, a hollow portion at one end of the shank portion and an annulus of greater cross-sectional thickness surrounding the open end of the hollow portion, heating the blank to forging temperature then extruding the annulus of the blank into a cylindrical seamless tube of slightly less length than required in the finished propeller blade and in the same operation simultaneously extruding diametrically opposite longitudinal ribs upon the exterior of the tube, said tube being a continuation of said hollow portion then inserting a mandrel in the tube, then in a drawing operation drawing the tube over the mandrel and through a die to final finished length while maintaining the longitudinal ribs thereon, and then deforming the seamless extruded, drawn, longitudinally ribbed tube to substantially elliptic cross-sectional shape throughout the greater portion of its length to provide a seamless hollow blade of increasingly flatter elliptic cross-sectional shape from said shank portion toward the tip end, said longitudinal ribs forming the leading and trailing edges of the blade, and securing the flattened tip end of the blade together.

4. The method of making a seamless, hollow, metal propeller blade, which consists in forming a blank comprising a shank portion, a hollow portion at one end of the shank portion and an annulus of greater cross-sectional thickness surrounding the open end of the hollow portion, heating the blank to forging temperature then extruding the annulus of the blank into a cylindrical seamless tube of slightly less length than required in the finished propeller blade and in the same operation simultaneously extruding diametrically opposite longitudinal ribs upon the exterior of the tube, said tube being a continuation of the hollow portion and throughout the extruding operation pulling the shank portion longitudinally in the direction in which the tube is being extruded at a speed corresponding to the speed of the extrusion operation, then inserting a mandrel in the tube, then in a drawing operation drawing the tube over the mandrel and through a die to final finished length while maintaining the longitudinal ribs thereon, and then deforming the seamless, extruded, drawn, longitudinally ribbed tube to substantially elliptic cross-sectional shape throughout the greater portion of its length to provide a seamless hollow blade of increasingly flatter elliptic cross-sectional shape from said shank portion toward the tip end, said longitudinal ribs forming the leading and trailing edges of the blade, and securing the flattened tip end of the blade together.

5. The method of making a seamless, hollow, metal propeller blade, which consists in forming a blank comprising a shank portion, a hollow portion at one end of the shank portion and an annulus of greater cross-sectional thickness surrounding the open end of the hollow portion, heating the blank to forging temperature then extruding the annulus of the blank into a cylindrical seamless tube of less length than required in the finished propeller blade and in the same operation simultaneously extruding diametrically opposite longitudinal ribs upon the exterior of the tube, said tube being a continuation of the hollow portion then bonderizing the extruded tube, then inserting a mandrel in the tube, then in a drawing operation drawing the tube over the mandrel and through a die to final finished length while maintaining the longitudinal ribs thereon, and then deforming the seamless extruded, drawn, longitudinally ribbed tube to substantially elliptic cross-sectional shape throughout the greater portion of its length to provide a seamless hollow blade of increasingly flatter elliptic cross-sectional shape from said shank portion toward the tip end, said longitudinal ribs forming the leading and trailing edges of the blade, and securing the flattened tip end of the blade together.

6. The method of making a seamless, hollow, metal propeller blade, which consists in forging a blank comprising a shank portion, a hollow thin-walled cylindrical portion of greater diameter than the shank, having an outwardly flared portion connected to one end of the shank portion and an annulus of greater cross-sectional thickness surrounding the open end of the hollow cylindrical portion, heating the blank to forging temperature, inserting the hollow thin-walled cylindrical portion of the blank through a die, inserting a shouldered punch into the annulus and moving the shouldered punch against the outer end of the annulus to extrude the same into a cylindrical seamless tube of slightly less length than required in the finished propeller blade, and in the same operation simultaneously extruding diametrically opposite longitudinal ribs upon the exterior of the tube and corresponding longitudinal grooves in the interior of the tube, said tube being a continuation of said hollow cylindrical portion, and throughout the extruding operation pulling the shank portion longitudinally in the direction in which the tube is being extruded at a speed corresponding to the speed of the extrusion operation, and in a drawing operation drawing the tube to final finished length while maintaining the longitudinal ribs and grooves thereon, and then deforming the seamless, extruded, drawn, longitudinally ribbed tube to substantially elliptic cross-sectional shape throughout the greater portion of its length to provide a seamless hollow blade of increasingly flatter elliptic cross-sectional shape from said shank portion toward the tip end, said longitudinal ribs forming the leading and trailing edges of the blade, and welding the flattened tip end of the blade together.

CHARLES A. BRAUCHLER.
CHANDIS H. BRAUCHLER.

References Cited in the file of this patent

UNITED STATES PATENTS

| Number | Name | Date |
|---|---|---|
| 1,503,170 | Smith | July 29, 1924 |
| 1,702,278 | Simons | Feb. 19, 1929 |
| 1,869,478 | Heath | Aug. 2, 1932 |
| 1,924,294 | Shirk | Aug. 29, 1933 |
| 1,942,221 | Squires | Jan. 2, 1934 |
| 1,980,834 | Squires | Nov. 13, 1934 |
| 2,002,415 | Otto | May 21, 1935 |
| 2,081,645 | Squires | May 25, 1937 |
| 2,312,094 | Harmon | Feb. 23, 1943 |
| 2,312,095 | Welty | Feb. 23, 1943 |
| 2,485,534 | Mayne | Oct. 18, 1949 |